United States Patent

Nakao et al.

[15] 3,669,836

[45] June 13, 1972

[54] METHOD FOR THE PRODUCTION OF COENZYME A

[72] Inventors: Yoshio Nakao, Ibaraki; Mitsuzo Kuno, Suita; Saburo Yamatodani, Minoo; Fumihiko Tanaka, Suita; Tsutomu Nojiri, Nishinomiya, all of Japan

[73] Assignee: Takeda Chemical Industries, Ltd., Osaka, Japan

[22] Filed: April 14, 1967

[21] Appl. No.: 630,803

[30] Foreign Application Priority Data

April 16, 1966 Japan.....................................41/24234

[52] U.S. Cl. ..............................195/28 N, 195/96, 195/100
[51] Int. Cl. .......................................................C12d 13/06
[58] Field of Search...............................195/28 N, 28, 3, 3 H

[56] References Cited

UNITED STATES PATENTS 3,222,258  12/1965  Iizuka et al............................195/3 H
3,308,035   3/1967  Douros et al. ..........................195/28
3,355,296  11/1967  Perkins et al. ............................195/3

OTHER PUBLICATIONS

Foster, Antonie Van Leevwenhoek, J Microbiol. Serol. Vol. 28 Pages 241– 247

Brown, J., Biol. Chem., Vol. 234, Pages 370– 382, (1959).

*Primary Examiner*—Alvin E. Tanenholtz
*Attorney*—Wenderoth, Lind & Ponack

[57] ABSTRACT

Coenzyme A is produced in a good yield by incubating hydrocarbons-assimilating microorganisms belonging to the genera Corynebacterium, Brevibacterium, Pseudomonas or Arthrobacter in a culture medium comprising a carbon source consisting mainly of hydrocarbons containing not less than 10 percent (volume/volume) of normal paraffins of nine to 23 carbon atoms, and recovering coenzyme A accumulated in the culture broth.

15 Claims, No Drawings

METHOD FOR THE PRODUCTION OF COENZYME A

This invention relates to a method for the production of coenzyme A. More particularly, this invention relates to a method for producing coenzyme A, which comprises inoculating a hydrocarbons-assimilating microorganism of one of the genera Corynebacterium, Brevibacterium, Pseudomonas and Arthrobacter onto a culture medium comprising a carbon source consisting mainly of hydrocarbons containing not less than 10 percent (volume/volume: throughout the specification and the working examples, percentages are volume/volume unless otherwise specified) of normal paraffins, the number of carbon atoms of which is within the range from nine to 23, incubating the culture medium until coenzyme A is substantially accumulated in the culture broth, and recovering therefrom so-accumulated coenzyme A.

Coenzyme A plays vital physiological roles, for example, in lipid metabolism, in carbohydrate metabolism, in steroid biosynthesis, and in carotenoid biosynthesis. Though coenzyme A is contained in various kinds of animal tissues such as liver or microorganism cells, its content in such materials is very small. Therefore the hitherto-employed method for producing coenzyme A by subjecting the coenzyme A-containing materials such as microorganism cells to extraction is not industrially profitable.

It has long been an art desideratum to establish an industrially profitable method for producing coenzyme A.

The present invention, fulfilling the said desideratum, and thus providing a useful and industrially feasible process for producing coenzyme A, is based on the following new findings.

Among the microorganisms of the genera Corynebacterium, Brevibacterium, Pseudomonas and Arthrobacter, there are microorganisms which are capable of assimilating hydrocarbons, especially normal paraffins having a carbon atom number within the range from nine to 23, which are readily available at a relatively low cost as carbon sources among various kinds of hydrocarbons. Further, when these microorganisms are incubated in a culture medium wherein the carbon source consists mainly of hydrocarbons containing the said normal paraffins, a remarkably large amount of cells containing a considerably large amount of coenzyme A, as compared with the case of conducting incubation in a conventional medium containing as carbon sources carbohydrates such as glucose and molasses, is obtained. Thus, coenzyme A can be recovered from the culture broth in good yield at low cost.

It is thus the main object of this invention to provide a new and useful method for the industrial production of coenzyme A.

Another object of the invention is an improvement in minimizing troublesome procedures and disadvantages entailed in effecting the hitherto-known microbial process for the production of coenzyme A.

The microorganisms employable for the purpose of the present invention can be selected from those which belong to genera Corynebacterium, Brevibacterium, Pseudomonas or Arthrobacter and which can assimilate hydrocarbons. Such microorganisms are exemplified e.g. by *Corynebacterium hydrocarboclastus*, *Corynebacterium fascians*, *Brevibacterium alkanolyticum nov. sp.*, *Brevibacterium alkanophilium nov. sp.*, *Brevibacterium leucinophagum*, *Pseudomonas alkanolytica nov. sp.*, *Pseudomonas aeruginosa* and *Arthrobacter simplex*.

Among these microorganisms, *Brevibacterium alkanolyticum nov. sp.*, *Brevibacterium alkanophilum nov. sp.* and *Pseudomonas alkanylytica nov. sp.* were isolated from soil in Osaka, Japan and confirmed as novel species.

The *Brevibacterium alkanolyticum nov. sp.* has the following characteristics which are confirmed according to the description in the "Manual of Microbiological Methods, Society of American Bacteriologists (1957)":

(I) Cell characteristics:
Small rods, 0.8 to 1.0 by 1.0 to 1.2 microns. Non-motile and non-sporulating.
(II) Staining characteristics:
Gram-positive.
(III) Cultural characteristics:
1. Nutrient agar plate: Untransparent greyish white to pale orange color. Circular, entire, convex surface.
2. Nutrient agar slant: Greyish white to pale orange color, filiform.
3. Nutrient agar stab: Growth on surface filiform.
4. Nutrient broth: Turbidity with sediment. Non-formation of velum.
(IV) Physiological characteristics:
1. pH relations: Growth at pH 5.0 to 9.0, optimum at about 7.0.
2. Temperature relations: Growth at 15 to 37° C, optimum at about 37° C.
3. $O_2$ relations: aerobic.
4. Gelatin: No liquefaction.
5. Starch assimilation: Negative.
6. Urea assimilation: Negative.
7. Indol: Not produced.
8. Ammonia: Not produced.
9. Hydrogen sulfide: Not produced.
10. Nitrates reduction: Nitrites produced from nitrates.
11. Catalase: Positive.
12. Acetylmethylcarbinol: Not produced.
13. Methyl red test: Negative.
14. Litmus milk: No change.
15. No acid and no gas from glucose, fructose, galactose, mannose, xylose, arabinose, sucrose, lactose, maltose, mannitol, sorbitol, glycerol.

Detailed comparison of the above-mentioned characteristics with the description in "Bergey's Manual of Determinative Bacteriology," Seventh edition, reveals that this microorganism belongs to the genus Brevibacterium, judged from such characteristics as Gram-positive, cells without endospores, straight unbranched rods, pale orange pigments, and that pleomorphism was not observed. But the present microorganism is quite different from any of the species belonging to Brevibacterium described in the above-mentioned reference and from *Brevibacterium alkanophilum nov. sp.* in characteristics. Therefore, the present microorganism is a novel species of the genus Brevibacterium, and has been named *Brevibacterium alkanolyticum*. A specimen of *Brevibacterium alkanolyticum nov. sp.* has been deposited at American Type Culture Collection under the accession number ATCC 21033.

The *Brevibacterium alkanophilum nov. sp.* has the following characteristics which are confirmed according to the description in the above-mentioned "Manual of Microbiological Methods":

(I) Cell characteristics:
Small rods, 1.0 to 1.2 by 1.2 to 2.0 microns. Non-motile and non-sporulating.
(II) Staining characteristic:
Gram-positive.
(III) Cultural characteristics:
1. Nutrient agar plate: Untransparent pale orange color, dotty, entire, convex surface.
2. Nutrient agar slant: Filiform.
3. Nutrient agar stab: Growth on surface. Filiform.
4. Nutrient broth: Slight turbidity with sediment. Non-formation of velum.
(IV) Physiological characteristics:
1. pH relations: Growth at pH 5.0 to 9.0, optimum at about 7.0.
2. Temperature relations: Growth at 15 to 37° C, optimum at about 28° C.
3. $O_2$ relations: aerobic.
4. Gelatin: No liquefaction.
5. Starch assimilation: Negative.
6. Urea assimilation: Positive.
7. Indol: Not produced.
8. Ammonia: Not produced.
9. Hydrogen sulfide: Produced.
10. Nitrates reduction: Nitrates produced from nitrates.
11. Catalase: Positive.
12. Acetylmethylcarbinol: not produced.

13. Methyl red test: Negative.
14. Litmus milk: Alkaline.
15. No acid and no gas from glucose, fructose, galactose, mannose, xylose, arabinose, sucrose, lactose, maltose, mannitol, sorbitol and glycerol.

Detailed comparison of the above-mentioned characteristics with the description in "Bergey's Manual of Determinative Bacteriology," Seventh Edition, reveals that this microorganism belongs to the genus Brevibacterium, judged from such characteristics as Gram-positive, cells without endospores, straight unbranched rods, pale orange pigments, and that pleomorphism was not observed. But the present microorganism is quite different from any of the species belonging to Brevibacterium described in the said reference and from the above-mentioned *Brevibacterium alkanolyticum nov. sp.* in characteristics. Therefore, the present microorganism is a novel species of the genus Brevibacterium, and has been named *Brevibacterium alkanophilum*. A specimen of *Brevibacterium alkanophilum nov. sp.* has been deposited at American Type Culture Collection under the accession number ATCC 21071.

The *Pseudomonas alkanolytica Nov. sp.* has the following characteristics which are confirmed according to the description in the above-mentioned Manual of Microbiological Methods:

(I) Cell characteristics:
  Small rods near to cocci, 0.9 by 1.1 microns. Non-motile and non-sporulating.
(II) Staining characteristic:
  Gram-negative.
(III) Cultural characteristics:
  1. Nutrient agar plate: Untransparent greyish white, circular, smooth, entire, convex surface.
  2. Nutrient agar slant: Growth abundant, greyish white spreading.
  3. Nutrient agar stab: Growth on surface, filiform.
  4. Nutrient broth: Turbidity with sediment, non-formation of velum.
(IV) Physiological characteristics:
  1. pH relations: Growth at pH 5.0 to 9.0, optimum at about 7.0.
  2. Temperature relations: Growth at 15 to 37° C, optimum at 37° C.
  3. $O_2$ relations: aerobic.
  4. Gelatin: No liquefaction.
  5. Starch assimilation: Negative
  6. Urea assimilation: Negative.
  7. Indol: Not produced.
  8. Ammonia: Not produced.
  9. Hydrogen sulfide: Not produced.
  10. Nitrates reduction: Nitrites produced from nitrates.
  11. Catalase: Positive.
  12. Acetylmethylcarbinol: Not produced.
  13. Methyl red test: Negative.
  14. Litmus milk: Coagulated and acidic, litmus not reduced.
  15. Acid but not gas from glucose, galactose, mannose, xylose. No acid and no gas from fructose, arabinose, sucrose, lactose, maltose, mannitol, sorbitol, glycerol.

Detailed comparison of the above-mentioned characteristics with the descriptions in "Bergey's Manual of Determinative Bacteriology," Seventh Edition, reveals that this microorganism belongs to the genus Psuedomonas. But this microorganism is quite different from any of the species belonging to Pseudomonas described in the above-mentioned reference in microbial characteristics. Therefore, this microorganism is a novel species of the genus Pseudomonas, and has been named *Pseudomonas alkanolytica*.

A specimen of the *Pseudomonas alkanolytica Nov. sp.* has been deposited at American Type Culture Collection, Maryland, U.S.A., under the accession number ATCC 21034.

In carrying out the method of this invention, it is generally preferable to employ a liquid culture medium, and the incubation is carried out aerobically, i.e. with aeration, under static or submerged conditions. The culture medium employed in this invention is required to contain, as a carbon source, hydrocarbons containing normal paraffins of a carbon atom number within the range of nine to 23.

The amount of the said normal paraffins contained in the hydrocarbons should be not less than 10 percent of the entire amount of hydrocarbons employed, from the standpoint of the growth of the microorganism as well as the yield of the objective coenzyme A.

The normal paraffins may be either those which consist of only one kind of normal paraffins of a carbon atom number within the range of nine to 23 or those which consist of two or more kinds of normal paraffins, each having a carbon atom number within the range of nine to 23. Hydrocarbons consisting only of the said normal paraffins are most advantageously employed in the present invention. But the hydrocarbon source in the present invention may, occasionally, contain other hydrocarbons (e.g. branched paraffins, olefins, cyclic paraffins, aromatic hydrocarbon, normal paraffins of one to eight or not less than 24 carbon atoms, etc.) than the normal paraffins of carbon atom numbers within the range of nine to 23, as long as the normal paraffins of carbon atom number within the range of nine to 23 are included as a whole in an amount of not less than 10 percent.

From the viewpoints of both the growth of the microorganism and yield of the objective coenzyme A, the hydrocarbons are generally used in such an amount as to make the concentration of the normal paraffins of carbon atom numbers within the range of nine to 23 in the culture medium, as a whole, about 3 to 20 percent.

As these hydrocarbons are scarcely soluble in water, the addition thereof to an aqueous culture medium is practically carried out under stirring or shaking to prepare a suspension containing them as very fine particles. If desired, a suspending agent, e.g. a surfactant of the type of polyoxyethylene sorbitan monostearate (commercially available as Tween-60) may be employed. It is sufficient for the present method to use only these hydrocarbons as carbon sources but, if desired, commonly employable carbon sources such as carbohydrate (e.g. glucose) may be used together with the hydrocarbons.

The culture medium should contain nitrogen source(s) as well as the hydrocarbons as nutrients. As the nitrogen source(s), any of those used in the hitherto-known methods may be employed, and these may be exemplified by peptone, soybean powder, cornsteep liquor, meat extract, ammonium salts, organic or inorganic nitrogen compounds or nitrogen-containing materials. Furthermore, a small quantity of inorganic salts such as sodium chloride, potassium phosphate, salts of metals e.g. of magnesium, zinc, iron, manganese, etc. may be added to the medium.

Especially desirably, the culture medium may contain pantothenic acid or its salt such as calcium pantothenate, sodium pantothenate, etc. because a considerably enhanced amount of coenzyme A is accumulated in the culture broth when the above-mentioned microorganisms are incubated in such a medium.

Incubation conditions such as the pH of the medium and the incubation temperature should be controlled so as to have the objective coenzyme A accumulated in the maximum amount.

Generally, the pH of the culture medium and the incubation temperature are respectively adjusted to about 5.0 to 9.0, preferably about 6.0 to 8.0, and to about 20° to 40° C, preferably about 28° to 37° C.

Under the above-mentioned culture conditions, coenzyme A is produced and accumulated mostly in the cells but also in the liquid part of the culture broth with the lapse of time.

Incubation is continued until the maximum amount of coenzyme A is accumulated in the culture broth. Although the period required for the maximum accumulation of coenzyme A is changeable depending on various factors, the amount of coenzyme A in the culture broth generally reaches the maximum in about 5 to 72 hours after the start of the incubation.

Coenzyme A thus accumulated in the culture broth is recovered by simple procedures per se conventional. For example, after being separated from the culture broth, the cells are extracted with hot water, and the resultant extract and/or the cleared broth is(are) treated with activated charcoal and/or ion exchange resin.

Following examples are merely intended to illustrate presently preferred embodiments of the present invention and not to restrict the scope of the latter.

Throughout the present specification as well as in the following examples, the abbreviations "g," "ml," "l." and "° C" respectively refer to gram(s), milliliter(s), liter(s) and degrees centigrade. In the following examples, coenzyme A is determined by the method described in "Methods in Enzymology," Volume 1, Page 596, published by Academic Press Inc., U.S.A., in 1955.

EXAMPLE 1

*Corynebacterium hydrocarboclastus* (ATCC 21035) is inoculated in 100 ml. of the culture medium set forth in the following Table 1, and the medium is incubated under shaking at 28° C for 20 hours.

TABLE 1

| | |
|---|---|
| mixture of normal paraffins* | 100 ml. |
| ammonium nitrate | 10 g. |
| $KH_2PO_4$ | 20 g. |
| $K_2HPO_4$ | 6 g. |
| $MgSO_4 \cdot 7H_2O$ | 1 g. |
| $MnSO_4 \cdot 7H_2O$ | 0.01 g. |
| $ZnSO_4 \cdot 7H_2O$ | 0.01 g. |
| $FeSO_4 \cdot 7H_2O$ | 0.1 g. |
| cornsteep liquor | 5 g. |
| calcium pantothenate | 1 g. |
| water | up to 1 liter |
| | pH 7.0 |

* consisting of normal paraffins of carbon atom numbers within the range from 11 to 23, containing the specific normal paraffins in the following percentage relative to the whole weight of the mixture and having a boiling range from about 262° C to about 349° C:

| Carbon atom number | percent |
|---|---|
| 11 | 0.2 |
| 12 | 0.5 |
| 13 | 1.2 |
| 14 | 4.1 |
| 15 | 10.8 |
| 16 | 13.8 |
| 17 | 15.3 |
| 18 | 14.4 |
| 19 | 12.3 |
| 20 | 11.3 |
| 21 | 8.7 |
| 22 | 5.6 |
| 23 | 2.9 |

The resultant culture broth is inoculated in 1 l. of the culture medium of the same composition as that in Table 1, and incubated with aeration and agitation at 30° C for 24 hours, the medium being kept at pH 7.0 with aqueous ammonia, during the period of the incubation. After the incubation, the resultant cells are collected by centrifugation. After being washed with water, the cells are suspended in 0.5 l. of water. The suspension is heated at 100° C for 15 minutes and then the cells are removed by centrifugation to give 0.45 l. of extract. After the extract is adjusted to pH 8.0 with aqueous ammonia, 20 ml. of mercaptoethyl alcohol is added thereto. The mixture is allowed to pass through a column of anion exchange resin (Cl⁻type of Dowex 1 × 2) whereupon coenzyme A is adsorbed on the resin. After the resin is washed with water, the coenzyme A adsorbed on the resin is eluted with 4 l. of 0.25N-sodium chloride in 0.01N-hydrochloric acid. The eluate is allowed to pass through a column of activated charcoal whereupon coenzyme A is adsorbed on the charcoal.

Coenzyme A on the charcoal is eluted with 2 l. of a methanol-ammonia mixture ($MeOH:H_2O$: 28 percent $NH_4OH$= 500:500:1). The eluate is concentrated under reduced pressure to 20 ml. To the resultant solution is added 30 ml. of mercaptoethyl alcohol. After being kept standing at 5° C overnight, the mixture is diluted to 140 ml. with distilled water and then allowed to pass through a column packed with DEAE-Cellulose (Cl⁻type) whereupon coenzyme A is adsorbed on the cellulose is eluted by using a linear gradient technique wherein the mixing vessel contains 6 l. of 0.01N-lithium chloride in 0.003N-hydrochloric acid and the reservoir contains 6 l. of 0.2N-lithium chloride in 0.003N-hydrochloric acid. The resultant coenzyme A-containing fraction is concentrated under reduced pressure to give 130 mg of residue. The residue is washed with a mixture of acetone and methyl alcohol (10:1) and then dried to give 120 mg of coenzyme A (89% pure).

In the process of this example, when the incubation process is carried out with a culture medium containing 100 g. of glucose in place of the mixture of normal paraffins, less yield of coenzyme A, i.e. 46 mg. of about 88 percent pure coenzyme A, is obtained.

EXAMPLE 2

*Corynebacterium fascians* (ATCC 12974) is inoculated in 100 ml. of the culture medium set forth in the following Table 2, and the medium is incubated under shaking at 28° C for 20 hours.

TABLE 2

| | |
|---|---|
| mixture of normal paraffins* | 100 ml. |
| ammonium chloride | 6.0 g. |
| $KH_2PO_4$ | 15 g. |
| $Na_2HPO_4$ | 0.2 g. |
| $MgSO_4 \cdot 7H_2O$ | 2.5 g. |
| $CaCl_2 \cdot 2H_2O$ | 0.5 g. |
| $FeSO_4 \cdot 7H_2O$ | 0.1 g. |
| yeast extract | 2.0 g. |
| water | up to 1 liter |
| | pH 7.0 |

* same as Table 1.

The resultant culture broth is inoculated in 1 liter of the culture medium of the same composition as that in Table 2, and incubated with aeration and agitation at 30° C for 20 hours, the medium being kept at pH 7.0 with aqueous ammonia, during the period of the incubation. The resultant cells are treated after the manner described in Example 1 to yield 160 mg of coenzyme A (90 percent pure).

EXAMPLE 3

*Brevibacterium alkanolyticum nov. sp.* (ATCC 21033) is inoculated and incubated in 1 l. of the culture medium of the same composition as that in Table 1 of Example 1 with aeration and agitation at 30° C for 20 hours. The medium is kept at pH 7.0 with aqueous ammonia, during the period of the incubation.

The resultant cells are treated after the manner described in Example 1 to yield 100 mg. of coenzyme A (91 percent pure).

In the process of this example, when the incubation process is carried out in a culture medium containing 100 g. of glucose in place of the mixture of normal paraffins, the microorganism cannot substantially grow.

EXAMPLE 4

*Brevibacterium alkanophilum nov. sp.* (ATCC 21071) is inoculated and incubated in 1 l. of the culture medium of the same composition as that in Table 2 of Example 2 with aeration and agitation at 30° C for 18 hours, the medium being kept at pH 7.0 with aqueous ammonia, during the period of the incubation.

The resultant cells are treated after the manner described in Example 1 to yield 150 mg. of coenzyme A (88 percent pure).

EXAMPLE 5

*Brevibacterium leucinophagum* (ATCC13809) is inoculated and incubated in 1 l. of the culture medium of the same composition as mentioned in Table 2 of Example 2 with aeration and agitation at 30° C for 18 hours, the medium being kept at pH 7.0 with aqueous ammonia, during the period of the incubation.

The resultant cells are treated after the manner described in Example 1 to yield 100 mg of coenzyme A (90 percent pure).

EXAMPLE 6

*Pseudomonas alkanolytica nov. sp.* (ATCC 21034) is inoculated and incubated in 1 l. of the culture medium mentioned in the following Table 3 with aeration and agitation at 30° C for 15 hours, the medium being kept at pH 7.0 with aqueous ammonia, during the period of the incubation.

TABLE 3

| | |
|---|---|
| mixture of normal paraffins* | 100 ml |
| ammonium chloride | 6.0 g. |
| $KH_2PO_4$ | 15 g. |
| $Na_2HPO_4$ | 0.2 g. |
| $MgSO_4 \cdot 7H_2O$ | 2.5 g. |
| $CaCl_2 \cdot 2H_2O$ | 0.5 g. |
| $FeSO_4 \cdot 7H_2O$ | 0.1 g. |
| yeast extract | 2.0 g. |
| water | up to 1 liter |
| | pH 7.0 |

* Consisting of normal paraffins of carbon atom numbers within the range from 9 to 15, containing the specific normal paraffins in the following percentage relative to the whole weight of the mixture and having a boiling range from about 172 to 266° C;

| Carbon atom number | percent |
|---|---|
| 9 | 11.4 |
| 10 | 19.2 |
| 11 | 23.8 |
| 12 | 23.9 |
| 13 | 18.9 |
| 14 | 2.4 |
| 15 | 0.5 |

The resultant cells are treated after the manner described in Example 1 to yield 120 mg of coenzyme A (84 percent pure).

In the process of this example, when the incubation process is carried out in a culture medium containing 100 g. of glucose in place of the mixture of normal paraffins, the microorganism cannot substantially grow.

EXAMPLE 7

*Pseudomonas alkanolytica nov. sp.* (ATCC 21034) is inoculated and incubated in 1 l. of the culture medium of the same composition as described in Table 1 of Example 1 with aeration and agitation at 1° C for 12 hours, the medium being kept at pH 7.0 with aqueous ammonia, during the period of the incubation.

The resultant cells are treated after the manner described in Example 1 to yield 130 mg of coenzyme A (91 percent pure).

EXAMPLE 8

*Pseudomonas aeruginosa* (ATCC 21036) is inoculated and incubated in 1 l. of the culture medium of the same composition as that in Table 1 of Example 1 with aeration and agitation at 30° C for 24 hours, the medium being kept at pH 7.0 with aqueous ammonia, during the period of the incubation.

The resultant cells are treated after the manner described in Example 1 to yield 110 mg of coenzyme A (89 percent pure).

In the process of this example, when the incubation process is carried out in a culture medium containing 100 g. of glucose in place of the mixture of normal paraffins, less yield of coenzyme A, i.e. 40 mg of 89 percent pure coenzyme A, is obtained.

EXAMPLE 9

*Arthrobacter simplex* (ATCC 6946) is inoculated and incubated in 1 l. of the culture medium of the same composition as that in Table 1 of Example 1 with aeration and agitation, the medium being kept at pH 7.0 with aqueous ammonia, during the period of the incubation.

The resultant cells are treated after the manner described in Example 1 to yield 120 mg of coenzyme A (91 percent pure).

In the process of this example, when the incubation process is carried out in a culture medium containing 100 g. of glucose in place of the mixture of normal paraffins, less yield of coenzyme A, i.e. 40 mg of about 91 percent pure coenzyme A, is obtained.

The expression "normal paraffins" signifies, as usual in this regard, straight chain paraffin hydrocarbons, free from any side chains.

We claim:

1. In a method for producing coenzyme A, which comprises incubating a microorganism in a culture medium until coenzyme A is substantially accumulated in the microorganism cells and recovering therefrom coenzyme A so accumulated, the improvement wherein the microorganism is a hydrocarbons-assimilating microorganism of one of the genera Corynebacterium, Brevibacterium, Pseudomonas and Arthrobacter, and the culture medium comprises a carbon source consisting mainly of hydrocarbons containing not less than 10 percent (volume/volume) of normal paraffins having a carbon atom number within the range from nine to 23.

2. The improvement according to claim 1, wherein the culture medium contains about 3 to about 20 percent (volume/volume) of said normal paraffins.

3. The improvement according to claim 1, wherein the hydrocarbons are a mixture of normal paraffins of carbon atom numbers within the range from 11 to 23, the mixture having a boiling range from about 262° C to about 349° C.

4. A method according to claim 1, wherein the hydrocarbons are a mixture of normal paraffins of carbon atom numbers within the range from nine to 15, the mixture having a boiling range from about 172° C to about 266° C.

5. A method according to claim 1, wherein the coenzyme A is recovered from the microorganism cells separated from the culture broth.

6. A method according to claim 1, wherein the microorganism is *Corynebacterium hydrocarboclastus* (ATCC 21035).

7. A method according to claim 1, wherein the microorganism is *Corynebacterium fascians* (ATCC 12974).

8. A method according to claim 1, wherein the microorganism is *Brevibacterium alkanolyticum nov. sp.* (ATCC 21033).

9. A method according to claim 1, wherein the microorganism is *Brevibacterium aklanophilum nov.sp.* (ATCC 21071).

10. A method according to claim 1, wherein the microorganism is *Brevibacterium leucinophagum* (ATCC 13809).

11. A method according to claim 1, wherein the microorganism is *Pseudomonas alkanolytica nov. sp.* (ATCC 21034).

12. A method according to claim 1, wherein the microorganism is *Pseudomonas aeruginosa* (ATCC 21036).

13. A method according to claim 1, wherein the microorganism is *Arthrobacter simplex* (ATCC 6946).

14. A method for producing coenzyme A which comprises inoculating a hydrocarbons-assimilating microorganism which belongs to a genus selected from the group consisting of the genus Corynebacterium, the genus Brevibacterium, the genus Pseudomonas and the genus Arthrobacter, onto a culture medium comprising a carbon source consisting mainly of hydrocarbons containing not less than 10 percent (volume/volume) of normal paraffins having a carbon atom number within the range from nine to 23, incubating the culture medium until coenzyme A is substantially accumulated in the culture broth, and recovering therefrom the coenzyme A so accumulated.

15. A method for producing coenzyme A which comprises inoculating a microorganism selected from the group consisting of *Corynebacterium hydrocarboclastus*, *Corynebacterium fascians*, *Brevibacterium alkanolyticum nov. sp.*, *Brevibacterium alkanophilum nov. sp.*, *Brevibacterium leucinophagum*, *Pseudomonas alkanolytica nov. sp.*, *Pseudomonas aeruginosa* and *Arthrobacter simplex*, onto a culture medium comprising a carbon source consisting mainly of hydrocarbons containing not less than 10 percent (volume/volume) of normal paraffins having a carbon atom number within the range from nine to 23 and other nutrients required for the growth of the microorganism, incubating the culture medium at a temperature of about 20° to 40° C and at a pH value of about 5.0 to 9.0 under aerobic conditions until coenzyme A is substantially accumulated in the culture broth and recovering therefrom the coenzyme A so accumulated.

* * * * *